United States Patent [19]

Schuyler

[11] Patent Number: 5,581,987
[45] Date of Patent: Dec. 10, 1996

[54] MOWER BLADE

[76] Inventor: John P. Schuyler, 109 Wallasey Rd., Wilmington, Del. 19808

[21] Appl. No.: 466,575

[22] Filed: Jun. 6, 1995

[51] Int. Cl.⁶ .................................................. A01D 34/82
[52] U.S. Cl. ........................ 56/255; 56/295; 56/DIG. 17
[58] Field of Search ...................... 56/255, 295, 17.5, 56/DIG. 17, DIG. 20

[56] References Cited

U.S. PATENT DOCUMENTS

| | | |
|---|---|---|
| 2,697,323 | 12/1954 | Horn . |
| 2,720,071 | 10/1955 | Watanabe . |
| 2,924,059 | 2/1960 | Beetson . |
| 3,538,692 | 11/1970 | Cope . |
| 3,959,955 | 6/1976 | Smith et al. ............................. 56/17.5 |
| 3,998,037 | 12/1976 | Deans ........................................ 56/295 |
| 4,297,831 | 11/1981 | Hoch ......................................... 56/295 |
| 4,429,518 | 2/1984 | Fedeli ....................................... 56/295 |
| 5,167,109 | 12/1992 | Meinerding ............................... 56/295 |
| 5,291,725 | 3/1994 | Meinerding ............................... 56/295 |
| 5,345,788 | 9/1994 | Jerry ......................................... 56/255 |
| 5,357,698 | 10/1994 | Phillips ................................. 56/295 X |
| 5,357,738 | 10/1994 | Griffiths ................................... 56/17.5 |

Primary Examiner—Terry Lee Melius
Attorney, Agent, or Firm—Connolly & Hutz

[57] ABSTRACT

A rotary lawn mower includes a mower blade mounted below the deck which rotates about an axis generally centrally of the deck. The free end of the mower blade includes at least one channel shaped auxiliary cutter member mounted on its upper side. The auxiliary cutter member has a pair of spaced legs extending outwardly toward the underside of the deck. The legs are oriented generally radially on the blade with respect to the axis of rotation to form a path for air flow created by the rotating blade. Each of the legs has an inner edge which is tapered to comprise a sharpening edge for cutting clippings from cut grass and the like traveling in the path of air flow.

28 Claims, 4 Drawing Sheets

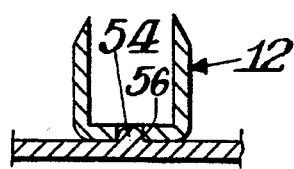
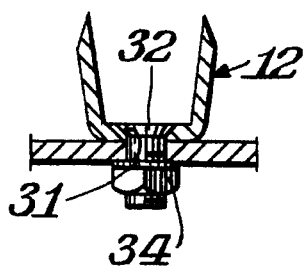
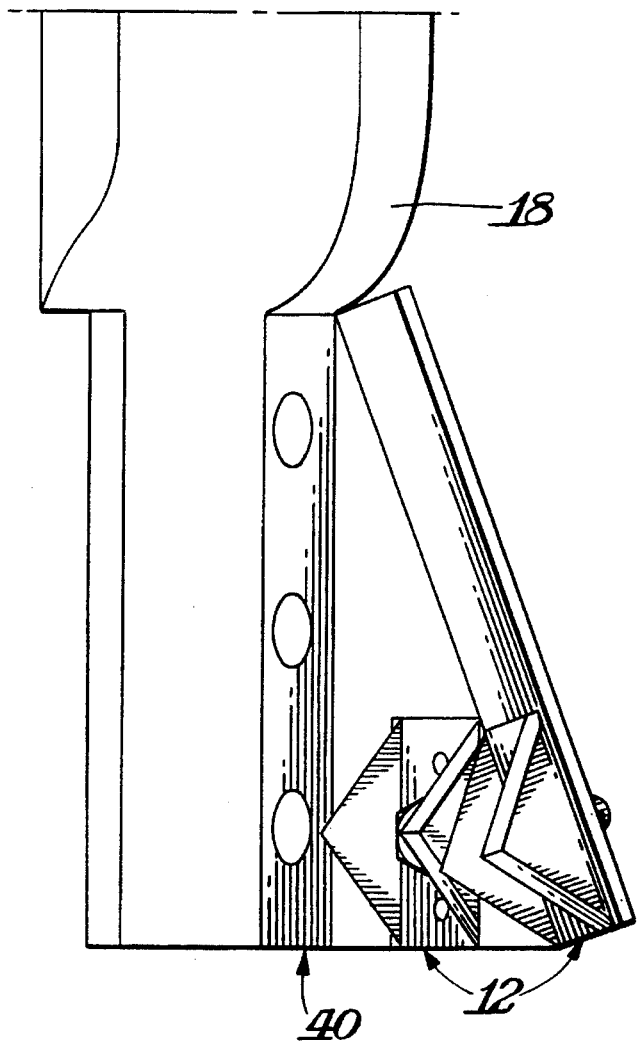
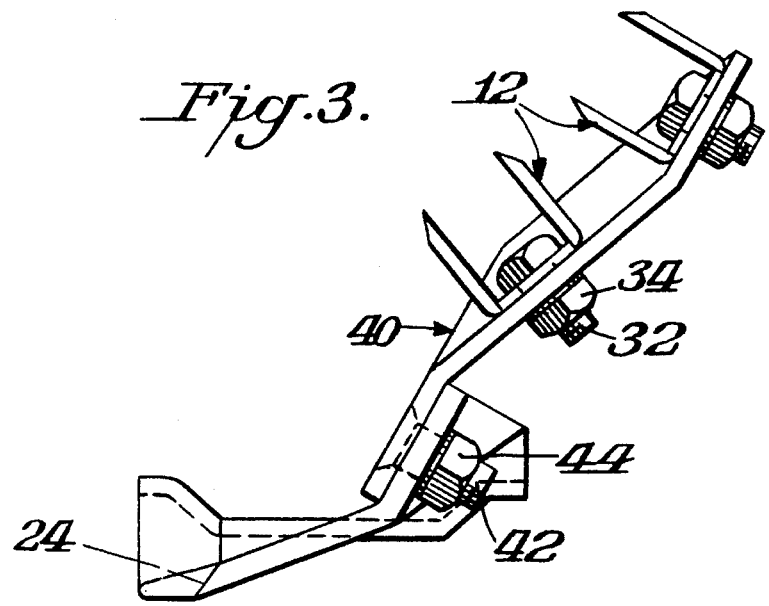

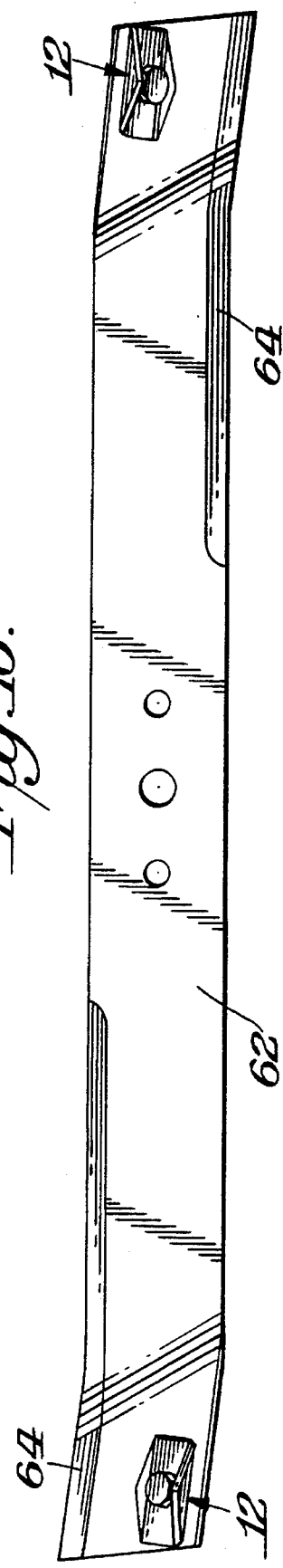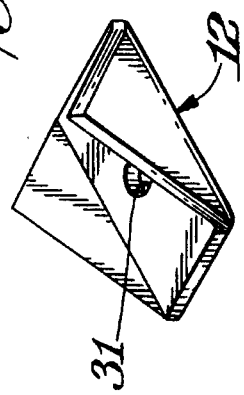

MOWER BLADE

BACKGROUND OF THE INVENTION

Rotary powered mowers are generally designed to be either cutting mowers or mulching mowers depending on the construction of the blade. A cutting mower would have an associated bag for catching the clippings. The bag must be periodically emptied as the bag becomes full. Mulching mowers operate with varying degrees of effectiveness with respect to how uniformly the mulch material is deposited in and on the grass. Generally, because of windrow there are uniformity problems with conventional mulching mowers.

SUMMARY OF THE INVENTION

An object of this invention is to provide improved rotary mower blade techniques which could be utilized with both cutting and mulching mowers.

A further object of this invention is to provide such a blade which has improved operation to add compaction where bagging is used and to spread the finer cuttings more evenly where used as a mulcher.

In accordance with this invention a generally conventional rotary lawn mower is modified to incorporate a channel shaped auxiliary cutter member at the free end of the blade. Conventional mower blades can have varying shapes or designs. The auxiliary cutter member can be used with any such blade by being located on the blade into the air flow which travels from the center of rotation to the blade tip. The auxiliary cutter member is mounted to the upper surface of the blade and has a plurality of spaced legs extending outwardly toward the underside of the mower deck. The legs are oriented generally radially on the blade with respect to the axis of rotation of the blade to form a path for air flow created by the rotating blade. Each of the legs has a sharpened inner edge disposed toward the axis of rotation to provide a supplemental cutting action to the clippings formed from the grass and the like cut by the blade itself.

Where the blade is of conventional construction which extends completely across the periphery under the deck so as to have two free ends, a set of auxiliary cutter members is disposed on each of the free ends of the blades. Each set of auxiliary cutter members may comprise a plurality of members either side by side and/or aligned with each other.

Although the cutter members can be integral with the blade, preferably the auxiliary cutter members are separate from the blade and reversibly mounted with cutting edges on each side of the legs so that the auxiliary cutter member could be rotated 180° and remounted to provide a fresh set of cutting edges.

In the preferred practice of this invention wherein the mower is a cutting mower, the free end of the blade includes a bracket having a flat face mounted against the blade and an inclined face disposed away from the blade. An auxiliary cutter member would be on each of the flat face and the inclined face, generally side by side.

A BRIEF DESCRIPTION OF THE DRAWINGS

FIG. 3 is a end elevational view of the portion of the blade shown in FIG. 2;

FIG. 4 is a top plan view of the portion of the blade shown in FIGS. 2–3;

FIGS. 5 and 5A are cross-sectional elevational views of modified forms of auxiliary cutter members in accordance with this invention;

FIG. 9 is a side elevational view of a mulching blade having auxiliary cutter members in accordance with this invention;

FIG. 10 is a top plan view of the blade shown in FIG. 9;

FIG. 11 is a right end elevational view of the blade shown in FIGS. 9 and 10; and FIG. 12 is a perspective view of the auxiliary cutter member shown in FIGS. 9–11.

DETAILED DESCRIPTION

The present invention is directed to improvements in the performance and efficiency in rotary mower blades. The mowers may be of known construction utilizing a single blade for cutting or mulching. The mowers may also be riding mowers and may be of multi-mower construction, such as a two-bladed mower. The blade may extend completely across the underside of the mower deck and rotate about a centrally located shaft. The invention may also be practiced where the axis of rotation is off-center. The concepts of the invention, however, will be described with respect to conventional cutting and mulching mowers.

Figure 1:
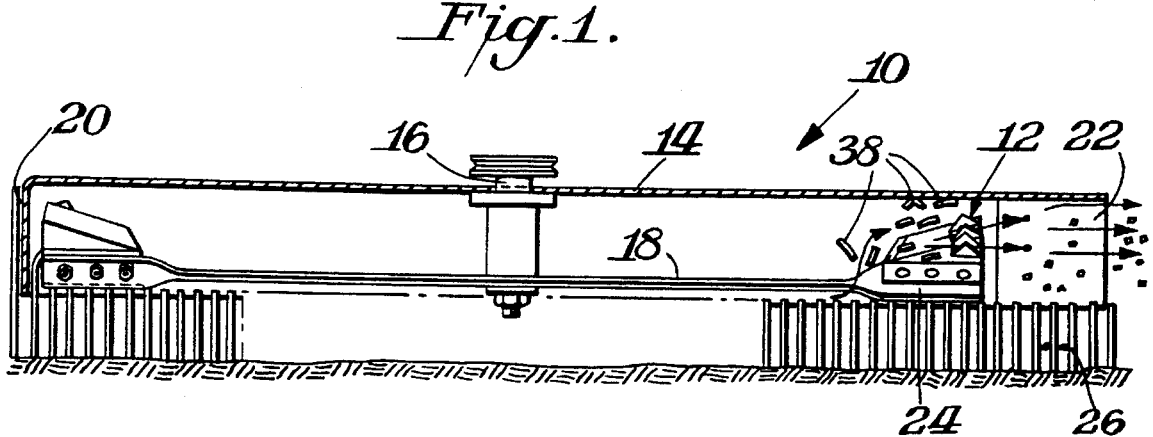
FIG. 1 is a cross-sectional view in elevation of a deck section of the lawn mower showing a cutting blade with a lifter bracket incorporating the auxiliary cutter members of this invention.

FIG. 1 illustrates a portion of a rotary lawn mower 10 which could be of generally conventional construction with the incorporation of auxiliary cutter members 12 in accordance with this invention. Since mower 10 is otherwise of generally conventional construction the details such as the bag, handles, motor, etc. are not necessary to be shown for an understanding of this invention. FIG. 1, however, illustrates a deck 14 through which a shaft 16 is mounted with a cutting blade 18 secured to shaft 16 for rotation about the shaft. The cutting blade 18 extends horizontally generally the length of the periphery of deck 14. Deck 14 includes a downturned rim or lip 20 along substantially its entire periphery except for an open area 22 which would communicate with the bag (not shown).

Where the mower is a mulching mower, lip 20 would extend completely around deck 14 and the right hand portion of the deck in FIG. 1 would have the same appearance as the left hand portion.

Blade 18 is provided with a cutting edge 24 at each of its free ends for cutting grass 26 and the like in a known manner. The rotating blade creates an air flow which directs the cuttings outwardly away from the axis of rotation of the blade. Because of the lip 20 the only exit for the cuttings is through open area 22 to a bag (not shown).

With conventional mowers the clippings are of a size which tends to fill the bag with grass, leaves or other refuse in a non-compacted manner thus requiring more frequent emptying of the bag. Additionally, with conventional mowers where the cutting is accomplished only with the cutting edges 24 some of the cuttings may tend to drop back into the lawn without being conveyed into the bag.

The present invention overcomes the above disadvantages by providing a highly efficient supplemental cutting action so as to subject the cuttings to at least one further cutting action whereby the cuttings which are directed into the bag are of much smaller size, thus providing a more compacted collection of cuttings requiring less bagging. Additionally, the auxiliary cutters tend to drive the debris or cuttings against the bottom and side of the deck where the falling cuttings are caught in the air flow traveling the length of the rotating blade so that virtually all of the cuttings must pass by the auxiliary cutter and thereby be subjected to at least one further cutting action before being discharged from underneath the deck.

The auxiliary cutter 12 may be of any suitable construction. Preferably auxiliary cutter 12 is a channel shaped rigid metal member having a base portion 28 and upstanding spaced legs 30. See FIG. 2 which shows each leg to be of plate-like structure. Auxiliary cutter 12 may be integral with the blade 18 such as being punched out of the blade. Preferably, however, auxiliary cutter 12 is a separate member which is secured to the blade in any suitable manner such as by welding or by fasteners. FIGS. 3 and 5A, for example, show bolts 32 extending through holes with nuts 34 mounted to the bolts. The inner or lead edge 36 of each leg 30 (that is the leg disposed toward the axis of rotation of blade 18) is tapered to a sharp edge to thereby comprise a supplemental cutting edge for the mower. Preferably fasteners are used which do not project into the channel between the legs 30. Thus, as shown in FIG. 5A the fastener would be flush with the base portion 28. This could be accomplished by a countersink for the bolt head or by using a threaded stud welded to base portion 28.

Each auxiliary cutter 12 is oriented so that it is generally radially directed toward the axis of rotation of blade 18. The preferred actual angles of orientation are illustrated in various figures. What is necessary is that the sharpened edges be located in the path of air flow. In this manner, the auxiliary cutter is able to capture the power of the air flow traveling the length of the blade 18 as blade 18 rotates. The air flow along blade 18 accelerates the debris or grass helping to bag or further cut debris 38 for compaction. The debris 38 is directed up high in the deck 14 where it is deflected and is cut by the edges 36 of auxiliary cutters 12. In a cutting/bagging the debris is then channeled to the bag or redirected under the deck where it is further cut. With mulching mowers the velocities and action produced by the system of this invention spreads the clippings on and in the lawn so as to eliminate the windrow associated with some of the mulching mowers not utilizing the invention.

As shown in FIGS. 1–4 blade 18 is provided with a lifter bracket 40 at each free end. Lifter bracket 40 may be secured in any suitable manner such as by nuts 42 mounted on bolts 44. See FIG. 3. Lifter bracket 40 includes a flat face 46 mounted flush against blade 18 and an inclined face 48 disposed toward the underside of deck 14. Where a lifter bracket is provided it is preferred to mount the cutters 12 to the bracket. The inclined face 48 of lifter bracket 40 may have a cutting edge 49 which could supplement the cutting action of cutters 12. Alternatively edge 49 could function as the auxiliary cutter and cutters 12 could be omitted within the practice of the invention.

Figure 2:
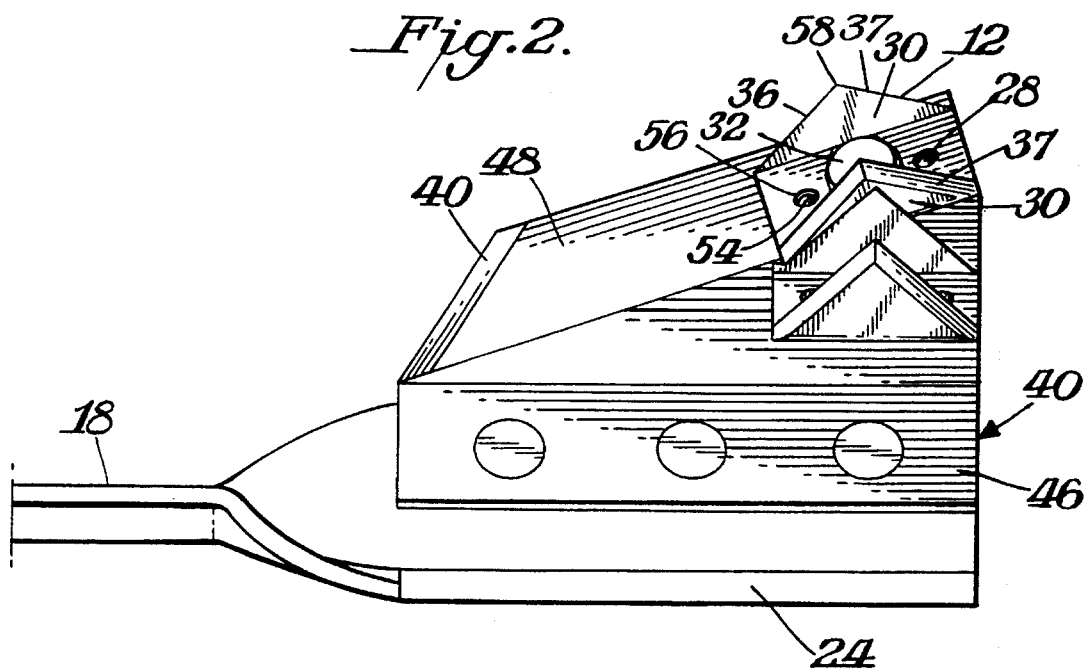
FIG. 2 is a fragmental end elevational view of the blade shown in FIG. 1.

Legs 30 of auxiliary cutter 12 may take any suitable form provided, however, that the legs should include a sharp tapered cutting edge disposed toward the axis of rotation of blade 18. Although two legs 30 are illustrated, any number of cutting legs may be used. In accordance with this invention in order to prolong the life of cutters 12, not only is the lead edge 36 tapered, but also the outer or the trailing edge 37 is tapered to be capable of being a cutting edge. See FIG. 2. Thus, it is possible to reversibly mount each auxiliary cutter. When inner edge 36 begins to get worn, the cutter 12 would be rotated 180° so that the edge 37 would then be disposed toward the axis of rotation. Where there is a reversible mounting it is preferred to incorporate some locking structure to assure that auxiliary cutter 12 is securely mounted in its intended position, rather than simply relying on the use of fasteners 32,34. FIGS. 2 and 5 illustrate such structure as including dimples or projections 54 located on lifter bracket 40 for being received in corresponding holes or recesses 56 in the base 28 of auxiliary cutter 12.

When it is desired to reverse the position of auxiliary cutter 12 all that is necessary is to loosen the fasteners 32,34 extending through centrally located opening 31. The fasteners can be completely detached or are loosened a sufficient amount so that auxiliary cutter 12 can be elevated a sufficient distance to disengage the dimples 54 from holes 56. Cutter 12 is then rotated 180° to reengage the dimples 54 with the corresponding holes 56. Fasteners 32,34 are then retightened to firmly mount auxiliary cutter 12 in place.

Instead of dimples 54 and holes 56 with centrally located fastening hole 31, other locking and fastening structures could be used. For example, a square bolt in a square hole would be a suitable fastener which would also function to lock the auxiliary cutter against rotation. Alternatively, base 28 could be provided with two or more holes and blade 18 (or lifter bracket 40) or blade 62 (FIGS. 9–10) would have correspondingly positioned holes. Fasteners would be engaged in the sets of holes of base 28 and its aligned holes in the blade. These plural holes would function as both fastening and locking holes. Where two holes are in base 28 the holes would be equally spaced from the longitudinal center of base 28.

Figure 6:
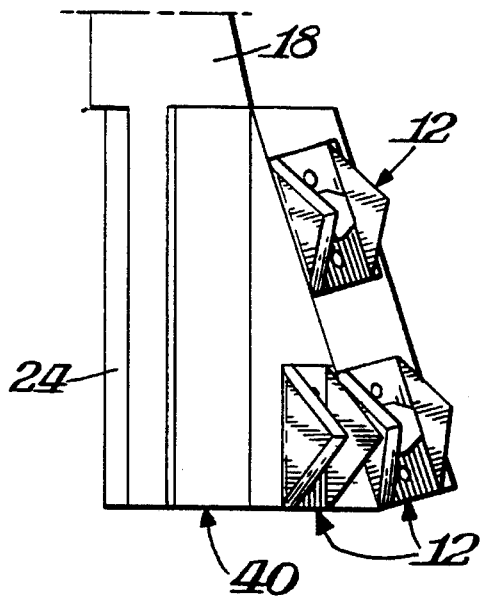
FIG. 6 is a top plan view showing an alternative arrangement of auxiliary cutter members in accordance with this invention.

Auxiliary cutters 12 may be provided in various types of sets. In the broad aspect of this invention a single auxiliary cutter may be provided on each free end of blade 18. It is preferred, however, to have sets of multiple cutters at each free end. FIGS. 1–4 illustrate a pair of side by side cutters wherein each auxiliary cutter terminates flush with the outer edge of bracket 40. FIG. 6 illustrates a variation where a further auxiliary cutter is mounted aligned with one of the side by side cutters. The auxiliary cutters could also be mounted staggered or could be in plural rows and columns. The cutters, however, should be at but not limited to the tip of the blade to take advantage of the maximum velocity of air flow.

Figure 7:
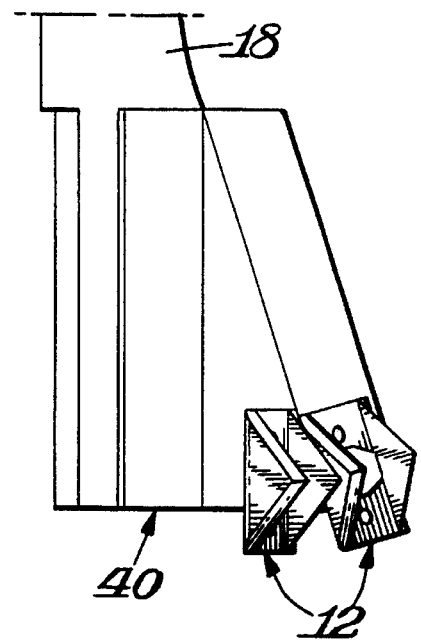
FIG. 7 is a top plan view similar to FIG. 6 showing yet another form of auxiliary cutter members in accordance with this invention.
Figure 8:
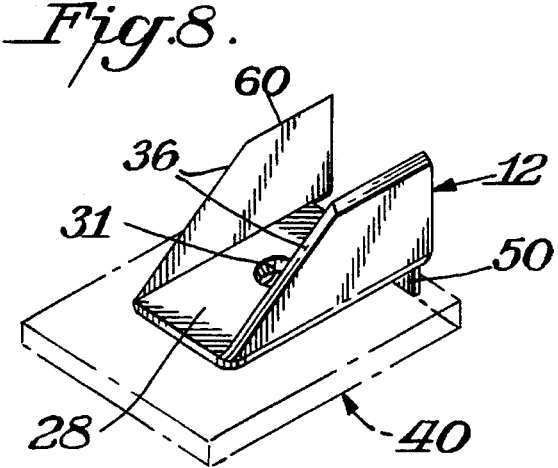
FIGS. 8 and 8A are perspective views showing still yet further forms of auxiliary cutter member in accordance with this invention.

FIGS. 1–4 and 6 illustrate an arrangement wherein none of the cutters extend outwardly beyond the lifter bracket 40 or blade 18. The invention, however, may be practiced such as illustrated in FIGS. 7 or 8 where the cutters extend outwardly beyond lifter bracket 40 or blade 18. In FIG. 7 cutters 12 are of the construction as in FIGS. 1–4. In the embodiment shown in FIG. 8 a lip 50 is provided on the underside of base 28 for fitting against the outer edge of lifter bracket 40 to assure proper positioning of modified auxiliary cutter 12.

Figure 8A:
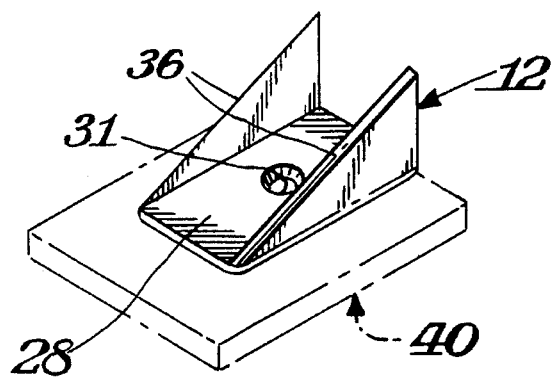
Figure 1:
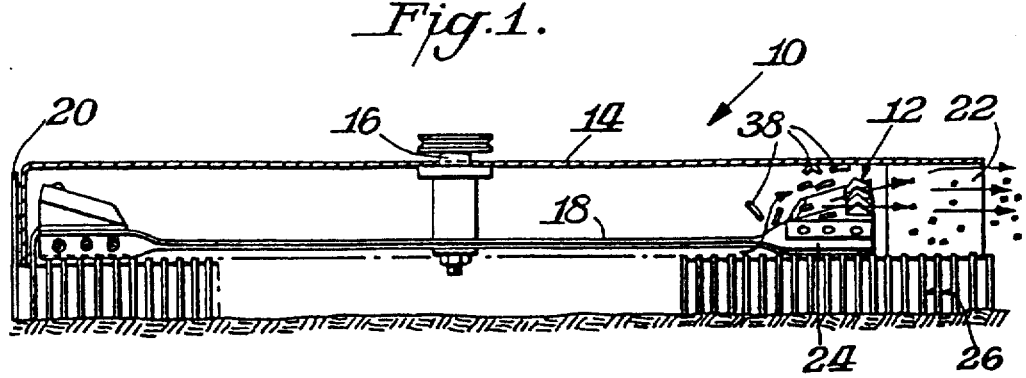
Figure 2:
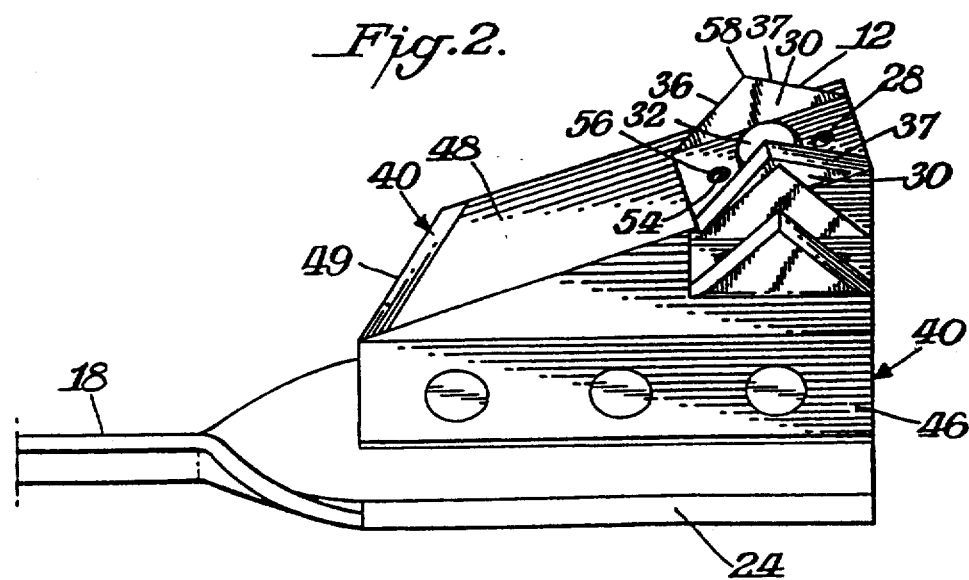

Legs 30 may be parallel to each other as shown in FIG. 5 or may slightly diverge as shown in FIG. 5A or if desired may slightly converge. Each set of edges 36 and 37 may join each other at a tip or point 58. If desired, however, the edges 36 and 37 may be spaced from each other by a horizontal cutting edge rather than a pointed tip. FIG. 8 shows yet another variation which is not intended for reversible mounting wherein edge 36 is connected to upper edge 60 which likewise is sharpened to enhance the cutting action of auxiliary cutter 12. FIG. 8A shows legs 30 to be at a relatively shallow angle with no horizontal edge to better prevent grass build-up on the cutter. The vertical edge could be ¾ inch high and the horizontal edge 1½ inches long.

FIGS. 9–12 illustrate the incorporation of cutters 12 on a mulching blade 62 which has enlarged cutting edges 64 at each end thereof as compared with blade 18 having shorter cutting edges 24. Each auxiliary cutter 12 is mounted on an off-set end portion 66 of blade 62. FIGS. 9–10 illustrate a practice of the invention where a single cutter is mounted at each free end of the blade.

Where the cutters 12 are used for mulching the cutters may be mounted directly to the mulching blade by bolts extending through mounting openings 31 in the same manner of mounting as for the cutting blades without including any mounting bracket.

The concepts of this invention may be utilized whereby only one blade, such as blade 18, would be necessary for mulching and bagging. Such blade would have the same cutting edge 24 for either mulching or cutting. By use of the invention there is added compaction for bagging. When it would be desired to use the mower 10 for mulching, the opening 22 in lip 20 would be closed by a detachable plug so that the lip extends completely around the underside of deck 14. The invention advantageously spreads the mulched material more evenly with the extra velocity keeping the cuttings from accumulating at the deck, especially under wet condition. The invention makes the mower particularly effective for cutting materials other than grass such as leaves, sweet gum balls, weeds, small sticks and various other materials found on lawns.

As can be appreciated the invention can be practiced to improve a cutting/bagging blade, to improve a mulching blade or to provide an improved universal blade which could be selectively used both for cutting and mulching.

It is to be understood that various features described with particular embodiments may be utilized with other embodiments within the spirit of this invention.

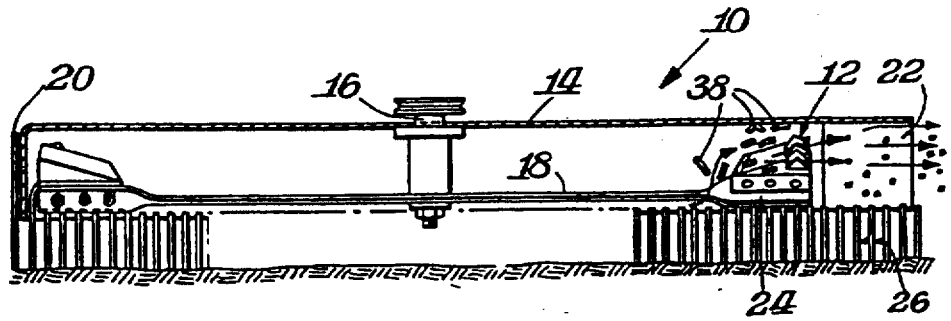

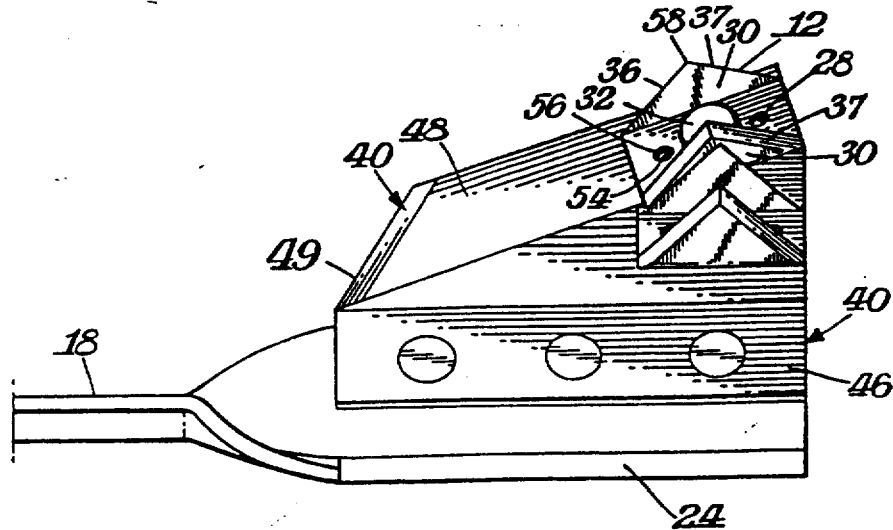

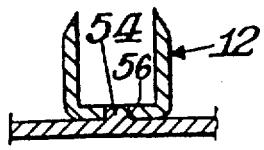
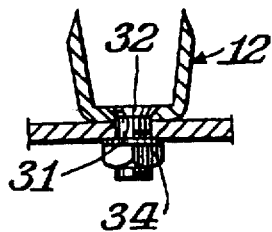
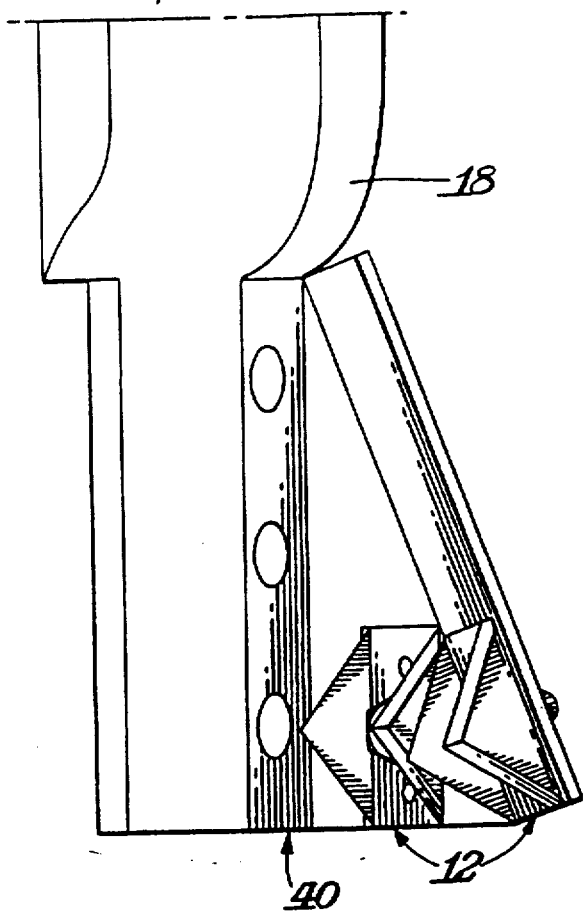
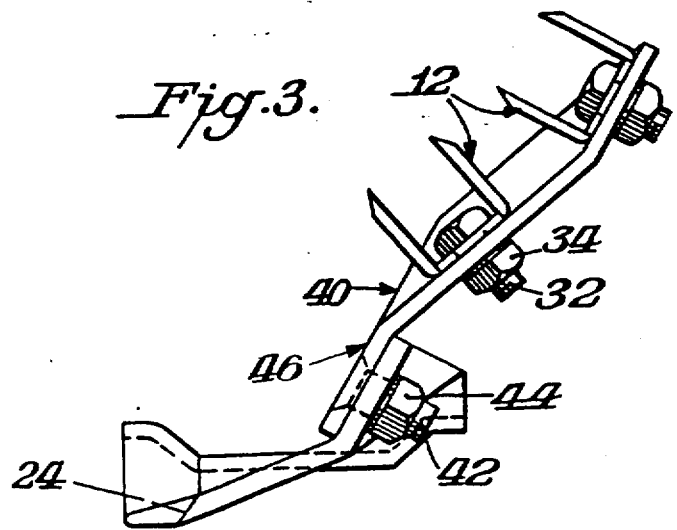

What is claimed is:

1. In a rotary mower having a power driven rotating blade for cutting grass and the like, said blade being mounted under a deck, said blade having mounting structure for rotationally mounting said blade about an axis of rotation, said blade having at least one free end disposed under said deck, said blade having an upper side disposed toward the underside of said deck, said blade having an underside disposed remote from said underside of said deck, said blade having a cutting edge between its said upper side and underside at said free end, the improvement being in that at least one auxiliary cutter member is secured to said upper side of said blade at said free end, said auxiliary cutter member being in the form of a plate member having a pair of flat sides extending outwardly from said upper side of said blade toward said underside of said deck, each of said sides being oriented generally radially on said blade with respect to said axis of rotation and generally parallel to said cutting edge of said blade and disposed in a path for air flow created by said rotating blade, said sides being interconnected by an inner edge disposed toward said axis of rotation and an outer edge disposed remote from said axis of rotation, said inner edge being in said path of air flow, and said inner edge being tapered to comprise a cutting edge for cutting clippings from cut grass and the like traveling generally in said path of air flow.

2. The mower of claim 1 wherein said auxiliary cutter is channel shaped having at least two of said plates.

3. The mower of claim 2 wherein said cutting edge of said cutter member is inclined in a direction outwardly away from said axis of rotation.

4. The mower of claim 3 wherein a plurality of said cutter members is secured to said free end.

5. The mower of claim 4 wherein said multiple cutter members are mounted generally side by side.

6. The mower of claim 4 wherein said multiple cutter members are mounted generally aligned with each other.

7. The mower of claim 1 wherein a plurality of said cutter members is secured to said free end.

8. The mower of claim 1 wherein said cutter member terminates at the outer edge of said free end of said blade.

9. The mower of claim 1 wherein said blade has two free ends, and at least one of said cutter members being on each of said free ends.

10. The mower of claim 1 wherein said deck includes a downwardly extending peripheral rim around a substantial portion of its periphery, said rim having an opening for communication with a bag, and said mower being a cutting mower.

11. The mower of claim 10 including a plug for closing said opening to convert said mower to a mulching mower.

12. The mower of claim 1 wherein said blade has two free ends which are mounted offset to the portion of said blade between said free ends, a cutter member being mounted on each of said offset free ends, said deck including a downwardly extending peripheral rim completely around its periphery, and said mower being a mulching mower.

13. The mower of claim 1 wherein a lifter bracket is mounted to said free end of said blade, said lifter bracket having a flat face mounted to said upper surface of said blade and an inclined face extending outwardly away from said blade, and said inclined face having a cutting edge.

14. The mower of claim 1 wherein said inner edge is tapered in a direction upwardly away from said upper side of said base and toward free end and is tapered from one of said sides to the other of said sides.

15. The mower of claim 14 wherein said outer edge of said plate has a taper which is a mirror image to said taper of said inner edge, and said plate being reversibly mounted to selectively dispose said inner edge and said outer edge toward said axis of rotation.

16. The mower of claim 15 wherein said auxiliary cutter member is channel shaped and has two of said plates extending outwardly from an intermediate base.

17. The mower of claim 1 wherein said outer edge of said plate has a taper which is a mirror image to said taper of said inner edge, and said plate being reversibly mounted to selectively dispose said inner edge and said outer edge toward said axis of rotation.

18. The mower of claim 1 including a lifter bracket mounted to said free end of said blade, said lifter bracket having a flat face mounted to said upper surface of said blade and an inclined face extending outwardly from said blade, said inclined face being disposed in said path of air flow, said inclined face being tapered to comprise a cutting edge, and said inclined face being said plate member.

19. The mower of claim 1 including a lifter bracket mounted to said free end of said blade, said lifter bracket having a flat face mounted to said upper surface of said blade and an inclined face extending outwardly from said blade, said inclined face being disposed in said path of air flow, said inclined face being tapered to comprise a cutting edge, and said plate member being mounted on one of said flat face and said inclined face.

20. In a rotary mower having a power driven rotating blade for cutting grass and the like, said blade being mounted under a deck, said blade having mounting structure for rotationally mounting said blade about an axis of rotation, said blade having at least one free end disposed under said deck, said blade having an upper side disposed toward the underside of said deck, said blade having an underside disposed remote from said underside of said deck, said blade having a cutting edge between its said upper side and underside at said free end, the improvement being in that an auxiliary cutter member is secured to said upper side of said blade at said free end, said auxiliary cutter member having at least one leg extending outwardly from said upper side of said blade toward said underside of said deck, said leg being oriented generally radially on said blade with respect to said axis of rotation to form a path for air flow created by said rotating blade, said leg having an inner edge disposed toward said axis of rotation and an outer edge disposed remote from said axis of rotation, said inner edge being tapered to comprise a cutting edge for cutting clippings from cut grass and the like traveling generally in said path of air flow, said auxiliary cutter being channel shaped having at least two of said legs, said cutting edge of said cutter member is inclined in a direction outwardly away from said axis of rotation, a plurality of said cutter members being secured to said free end, a lifter bracket being mounted to said free end of said blade, said lifter bracket having a flat face mounted to said upper surface of said blade and an inclined face extending outwardly away from said blade, and at least one cutter member being on each of said flat face and said inclined face.

21. The mower of claim 20 wherein said outer edge of each of said cutter members is tapered to comprise a cutting edge, and each of said cutter members is reversibly mounted to selectively dispose either of said cutting edges of said cutter member toward said axis of rotation.

22. The mower of claim 21 wherein said inner edge and said outer edge of said cutter member are joined together at a point.

23. The mower of claim 21 wherein said inner edge and said outer edge of said cutter member are connected by a generally horizontal edge which is tapered to form a further cutting edge.

24. The mower of claim 21 including locking structure for preventing rotation of said cutter member.

25. The mower of claim 21 wherein said blade has two free ends, and at least one of said cutter members being on each of said free ends.

26. The mower of claim 25 wherein identical sets of cutter members are on each of said two free ends.

27. In a rotary mower having a power driven rotating blade for cutting grass and the like, said blade being mounted under a deck, said blade having mounting structure for rotationally mounting said blade about an axis of rotation, said blade having at least one free end disposed under said deck, said blade having an upper side disposed toward the underside of said deck, said blade having an underside disposed remote from said underside of said deck, said blade having a cutting edge between its said upper side and underside at said free end, the improvement being in that an auxiliary cutter member is secured to said upper side of said blade at said free end, said auxiliary cutter member having at least one leg extending outwardly from said upper side of said blade toward said underside of said deck, said leg being oriented generally radially on said blade with respect to said axis of rotation to form a path for air flow created by said rotating blade, said leg having an inner edge disposed toward said axis of rotation and an outer edge disposed remote from said axis of rotation, said inner edge being tapered to comprise a cutting edge for cutting clippings from cut grass and the like traveling generally in said path of air flow, a lifter bracket being mounted to said free end of said blade, said lifter bracket having a flat face mounted to said upper surface of said blade and an inclined face extending outwardly away from said blade, and at least one cutter member being on each of said flat face and said inclined face.

28. A cutter member for attachment to a mower blade to provide a supplemental cutting action comprising a rigid channel shaped member having a flat base and two spaced outwardly extending thin flat legs forming a channel therebetween, said legs having inner walls disposed toward each other and outer walls disposed remote from each other, each of said legs having a lead edge and a trailing edge, said lead edge being tapered from said base upwardly and inwardly toward said trailing edge and being tapered from said inner wall to said outer wall to comprise a cutting edge, said trailing edge being tapered from said base upwardly and inwardly toward said lead edge and being tapered from said inner wall to said outer wall to comprise a cutting edge, fastening structure in said base to permit said cutter member to be selectively reversibly mounted to the blade, and locking structure in said base to prevent rotation of said cutter member.

* * * * *

UNITED STATES PATENT AND TRADEMARK OFFICE
CERTIFICATE OF CORRECTION

PATENT NO. : 5,581,987  
DATED : December 10, 1996  
INVENTOR(S) : John P. Schuyler Page 1 of 4

It is certified that error appears in the above-identified patent and that said Letters Patent is hereby corrected as shown below:

On the cover page in line 10 of the Abstract "sharpening" should be "sharpened";

Figures 2 and 3 and the reproduction of Figure 2 on the cover page are corrected as in the attached copies thereof.

Signed and Sealed this

Thirteenth Day of February, 2001

Attest:

NICHOLAS P. GODICI

*Attesting Officer*  *Acting Director of the United States Patent and Trademark Office*

United States Patent [19]

Schuyler

[11] Patent Number: 5,581,987
[45] Date of Patent: Dec. 10, 1996

[54] MOWER BLADE

[76] Inventor: John P. Schuyler, 109 Wallasey Rd., Wilmington, Del. 19808

[21] Appl. No.: 466,575

[22] Filed: Jun. 6, 1995

[51] Int. Cl.$^6$ ............................................. A01D 34/82
[52] U.S. Cl. ........................ 56/255; 56/295; 56/DIG. 17
[58] Field of Search ........................ 56/255, 295, 17.5, 56/DIG. 17, DIG. 20

[56] References Cited

U.S. PATENT DOCUMENTS

| | | |
|---|---|---|
| 2,697,323 | 12/1954 | Horn . |
| 2,720,071 | 10/1955 | Watanabe . |
| 2,924,059 | 2/1960 | Beetson . |
| 3,538,692 | 11/1970 | Cope . |
| 3,959,955 | 6/1976 | Smith et al. .......................... 56/17.5 |
| 3,998,037 | 12/1976 | Deans ................................... 56/295 |
| 4,297,831 | 11/1981 | Hoch ..................................... 56/295 |
| 4,429,518 | 2/1984 | Fedeli ................................... 56/295 |
| 5,167,109 | 12/1992 | Meinerding ........................... 56/295 |
| 5,291,725 | 3/1994 | Meinerding ........................... 56/295 |
| 5,345,788 | 9/1994 | Jerry ..................................... 56/255 |
| 5,357,698 | 10/1994 | Phillips ............................... 56/295 X |
| 5,357,738 | 10/1994 | Griffiths ............................... 56/17.5 |

Primary Examiner—Terry Lee Melius
Attorney, Agent, or Firm—Connolly & Hutz

[57] ABSTRACT

A rotary lawn mower includes a mower blade mounted below the deck which rotates about an axis generally centrally of the deck. The free end of the mower blade includes at least one channel shaped auxiliary cutter member mounted on its upper side. The auxiliary cutter member has a pair of spaced legs extending outwardly toward the underside of the deck. The legs are oriented generally radially on the blade with respect to the axis of rotation to form a path for air flow created by the rotating blade. Each of the legs has an inner edge which is tapered to comprise a sharpening edge for cutting clippings from cut grass and the like traveling in the path of air flow.

28 Claims, 4 Drawing Sheets